(12) United States Patent
Robb et al.

(10) Patent No.: US 11,939,164 B1
(45) Date of Patent: Mar. 26, 2024

(54) AUTOMATED ITEM HANDLING SYSTEMS AND METHODS

(71) Applicant: Amazon Technologies, Inc., Seattle, WA (US)

(72) Inventors: Larry Joe Robb, Miramar Beach, FL (US); Emily R. Parrish, Seattle, WA (US); Justin Stone, Frisco, TX (US); Jose Luis De La Rosa, Seattle, WA (US); Joshua Martin Middleton, Seattle, WA (US); Roland J. Menassa, Renton, WA (US); Eli Douglas Girod, Seattle, WA (US); Maxim P. Hoffman, Bothell, WA (US); Mohammad Mosa, Seattle, WA (US); Vatsal Mehta, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 305 days.

(21) Appl. No.: 16/909,282

(22) Filed: Jun. 23, 2020

(51) Int. Cl.
*B65G 1/137* (2006.01)
*B25J 9/00* (2006.01)
*B25J 9/16* (2006.01)
*B65G 47/14* (2006.01)
*B65G 47/24* (2006.01)

(52) U.S. Cl.
CPC .......... *B65G 1/1376* (2013.01); *B25J 9/0093* (2013.01); *B25J 9/1687* (2013.01); *B65G 47/1492* (2013.01); *B65G 47/24* (2013.01)

(58) Field of Classification Search
CPC ......... B07C 3/08; B07C 3/008; B65G 1/1373; B65G 1/1376; B65G 47/1492; B65G 47/24; G05B 2219/45047; B25J 9/0093; B25J 9/1687
See application file for complete search history.

(56) References Cited

U.S. PATENT DOCUMENTS

| | | | |
|---|---|---|---|
| 6,365,862 B1 * | 4/2002 | Miller | B07C 3/02 209/584 |
| 6,471,044 B1 * | 10/2002 | Isaacs | B65G 47/682 198/460.1 |
| 8,707,658 B2 * | 4/2014 | Schafer | B65G 1/1378 414/268 |
| 9,139,363 B2 * | 9/2015 | Lert | B65G 1/0492 |
| 10,016,789 B2 * | 7/2018 | Eger | B07C 3/02 |
| 10,221,015 B2 * | 3/2019 | Battles | B65G 47/1485 |
| 2017/0043953 A1 * | 2/2017 | Battles | B65G 1/04 |
| 2017/0157648 A1 * | 6/2017 | Wagner | B65G 43/08 |
| 2019/0039097 A1 * | 2/2019 | Carpenter | B65G 47/1492 |

* cited by examiner

*Primary Examiner* — Gregory W Adams
(74) *Attorney, Agent, or Firm* — Athorus, PLLC

(57) ABSTRACT

Described are automated systems and methods for the handling and processing of items at material handling facility. The exemplary systems and methods can receive the items from various upstream processes and systems and can process and handle the items so that they can be provided to various downstream processes and systems. The exemplary systems and methods can provide modular systems and methods that can perform automated singulation, sortation, retrieval, and packing of items without any manual handling.

17 Claims, 13 Drawing Sheets

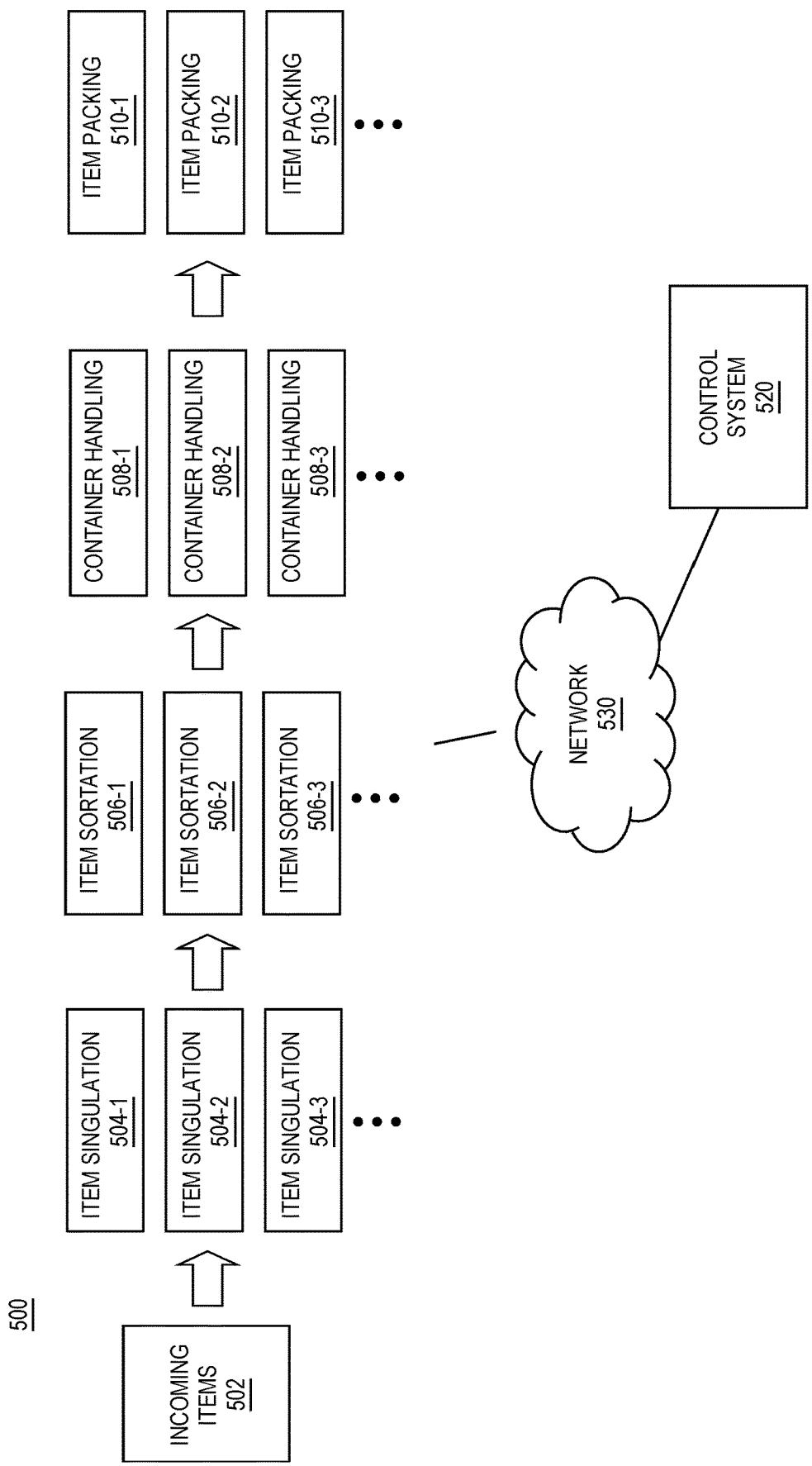

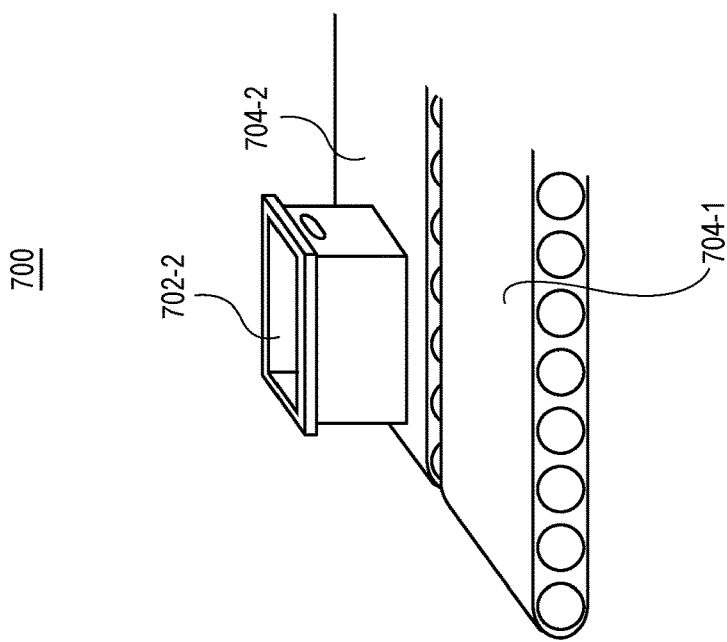
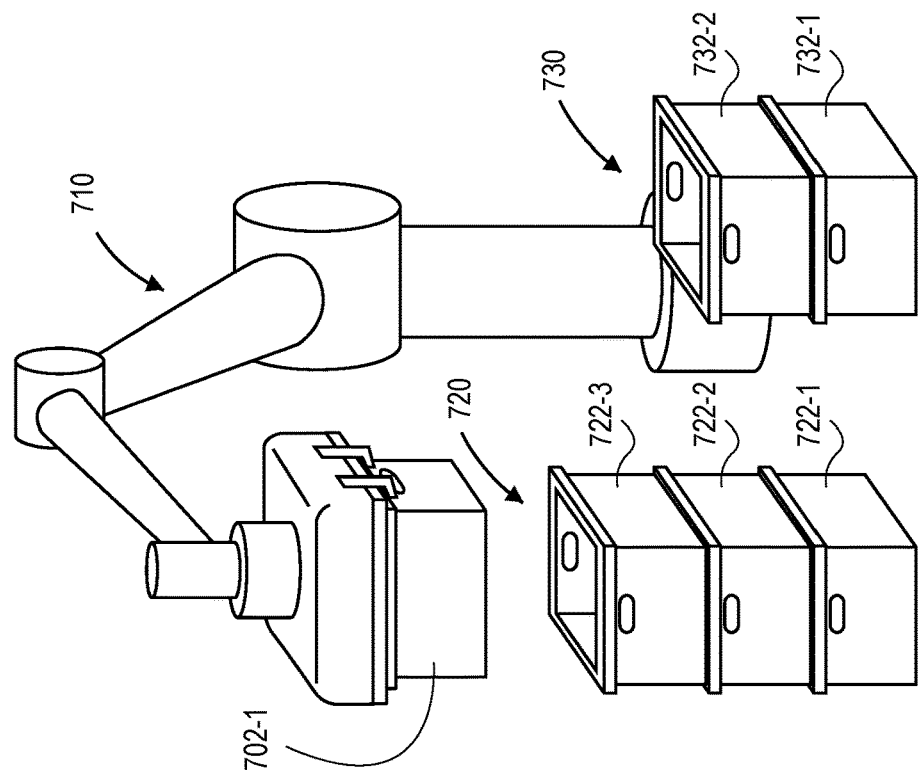
FIG. 7B

AUTOMATED ITEM HANDLING SYSTEMS AND METHODS

BACKGROUND

Many companies may store, package, and ship items and/or groups of items from material handling facilities. For example, many companies may store items in a material handling facility and ship items to various destinations (e.g., customers, stores) from the material handling facility. Receipt of items in the material handling facility, storage of items within the material handling facility, shipping of items from the material handling facility, and the overall flow or movement of items within the material handling facility (e.g., from receipt to storage to shipping) often incurs significant cost and time. Additionally, systems currently employed at material handling facilities typically include many discrete subsystems, require significant space and rely on significant manual handling of items.

BRIEF DESCRIPTION OF THE DRAWINGS

FIG. 5 is a block diagram of an exemplary automated item handling system, in accordance with embodiments of the present disclosure.

FIGS. 7A and 7B are schematic illustrations of an exemplary item packing station, in accordance with embodiments of the present disclosure.

Figure 1:
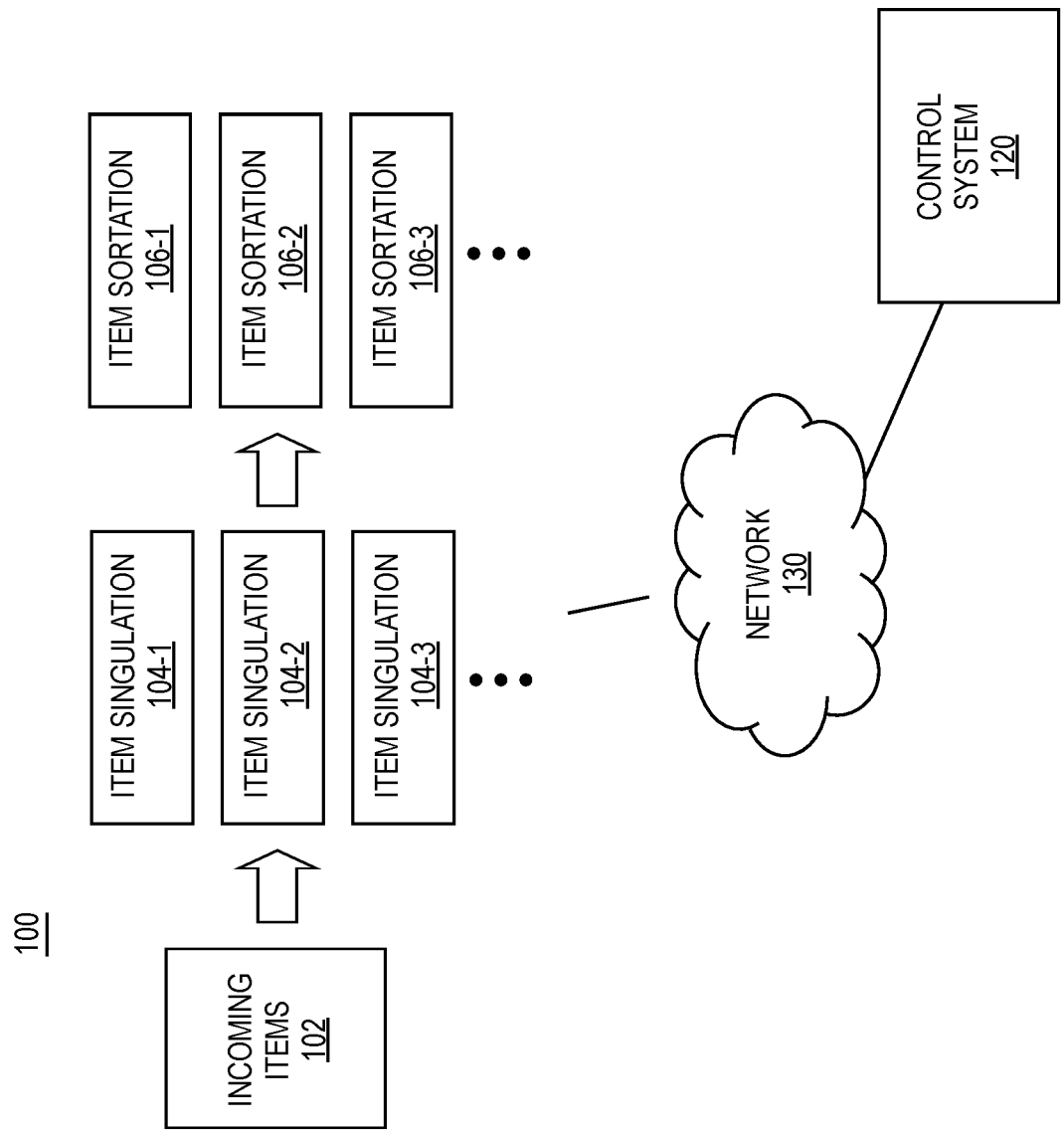
FIG. 1 is a block diagram of an exemplary automated item handling system, in accordance with embodiments of the present disclosure.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

As is set forth in greater detail below, embodiments of the present disclosure are generally directed to automated systems and methods for the handling and processing of items at a material handling facility. Embodiments of the present disclosure can be implemented in various material handling facilities (e.g., a cross dock center, a fulfillment center, a warehouse, etc.) to facilitate efficient, automated handling of items from receipt to packing. The exemplary system can receive the items from various upstream processes and systems and can process and handle the items so that they can be provided to various downstream processes and systems. Additionally, the exemplary systems can be implemented in a modular fashion such that one or more of the various components can be added or omitted in view of the needs and requirements for each specific implementation. Accordingly, embodiments of the present disclosure can provide customizable and modular automated systems and methods for the handling of items that can eliminate the need for manual handling of items and can reduce the amount of space that is typically required in the handling of such items.

According to embodiments of the present disclosure, an exemplary system for the automated handling of items can include one or more item singulation stations and one or more universal item sorters. The exemplary system can induct items, singulate the items, and provide the singulated items to one or more universal item sorters, which can sort the items into a plurality of containers based on the destination of the items. The one or more item singulation stations can be arranged in a configuration to be adjacent to the universal item sorters so that the singulated items can be transferred directly from the item singulation station to the universal item sorters without any manual handling of the items (e.g., handling by any workers, etc.). Additionally, the exemplary system can include a control system in communication with each of the various components to receive and provide data and instructions to facilitate automated handling of the items. Preferably, the exemplary systems and methods are able to ingest items in various containers and can provide automated handling of the items from induction of the items through sortation, without any manual intervention.

Optionally, the exemplary systems can further include one or more container handling systems and one or more packing stations. The container handling systems can provide automated retrieval and handling of the sorted items, and the packing stations can provide automated packing and preparation of the items for transport and/or downstream processes/systems. For example, the container handling system can detect and transport containers filled with items by the sorter to a conveyance that can transport the containers to the packing stations. At the packing stations, the containers can be prepared for transport and/or for further downstream processing. Additionally, the control system can also be in communication with each of these additional components to further provide fully automated handling of items from receipt to preparation for transport.

According to exemplary embodiments of the present disclosure, items received at a facility can first be offloaded and provided to the exemplary system. The items may comprise packages, boxes, containers, items, or other types of objects that may be received, separated, singulated, sorted, and packed in preparation to be transferred to various downstream processes. For example, the received items may first be received and processed by one or more item singulation stations. The item singulation stations can process, move, arrange, and separate the items to facilitate identification, picking, sortation, presentation, and/or other handling of the items. According to aspects of the present disclosure, the exemplary systems and methods can include one or more item singulation stations. The multiple item singulation systems can be implemented to facilitate parallel processing to increase throughput, facilitate processing of different item types (e.g., different size thresholds, boxed items versus unboxed items, items in containers versus items not in containers, etc.), etc.

After items have been processed by the item singulation stations, the items can be provided to one or more universal item sorters. The items may be sorted by the universal item sorters into a plurality of containers (e.g., bins, trays, totes, etc.). The items may be sorted by the universal item sorters in accordance with any sortation scheme. For example, the items may be sorted based on the requirements of downstream processes and handling of the items, destination of the items, similarity of the items, size of the items, and/or any other motivation for sorting of the various items. As with the item singulation stations, the exemplary systems and methods can include one or more universal item sorters. The multiple universal item sorters can be implemented to facilitate parallel processing to increase throughput, facilitate processing of different item types (e.g., different size thresholds, boxed items versus unboxed items, etc.), etc.

Once the items have been sorted into a plurality of containers, a container handling system can process and retrieve the containers holding the various sorted items. According to certain aspects of the present disclosure, each universal item sorter can include a respective container handling system. Alternatively, each universal item sorter can include more than one container handling system, or one container handling system can service more than one universal item sorter. The container handling system can include a robotic system that is able to detect full containers and retrieve the full containers from the universal item sorters to provide them to a downstream system or process (e.g., an item packing station). Additionally, the container handling system can replace the full container in the universal item sorter with an empty container.

The full container can then be transported to an item packing station. The item packing station can pack the containers in preparation for the next downstream process or system. For example, the item packing station can pack the containers into pallets for shipment to another material handling facility. Alternatively, the items in the containers can be packed into boxes, envelopes, or other shipping materials for delivery to the end consumer. As with the other components, the exemplary systems and methods according to embodiments of the present disclosure can include one or more item packing stations. The multiple item packing stations can be implemented to facilitate parallel processing to increase throughput, facilitate processing of different item types (e.g., different size thresholds, boxed items versus unboxed items, items in containers versus items not in containers, etc.), facilitate processing of items having different destinations, etc.

According to embodiments of the present disclosure, the handling of the item from receipt of the item at the item singulation station through packing of the item by the item packing station is preferably fully automated (without any manual intervention) and controlled by the control system. For example, the various components can include various sensors, and the control system can be in communication with each of the various item components to receive and send data and instructions to monitor and facilitate autonomous operation of the exemplary system.

FIG. 1 shows a block diagram of an exemplary automated item handling system 100 according to exemplary embodiments of the present disclosure. As shown in FIG. 1, exemplary automated item handling system 100 can facilitate automated handling and processing of incoming items 102.

According to exemplary embodiments of the present disclosure, automated item handling system 100 can include one or more item singulation stations 104-1, 104-2, 104-3 and one or more universal item sorters 106-1, 106-2, 106-3. The various systems of automated item handling system 100 can be implemented at item handling facilities to process incoming items. For example, the items can be received by automated item handling system 100 from upstream facilities or processes (e.g., an item supplier, from inventory, from a warehouse, etc.).

Although automated item handling system 100 is shown having three item singulation stations 104 and three universal item sorters 106, automated item handling system 100 can be implemented in a modular fashion to omit and/or include any number of any of item singulation stations 104 and universal item sorters 106. For example, the configuration of automated item handling system 100 can be customized based on the needs and requirements of the facility in which automated item handling system 100 may be implemented.

Automated item handling system 100 can also include control system 120, which can communicate with item singulation stations 104 and universal item sorters 106 via network 130. For example, network 130 can include any wired or wireless network (e.g., cellular, satellite, Bluetooth, Wi-Fi, etc.) such as a local area network, wide area network, etc. that can facilitate communications between item singulation stations 104 and universal item sorters 106 and control system 120. Item singulation stations 104, universal item sorters 106, and control system 120 can transmit data and other information, including one or more instructions, data, sensor information, commands, etc., via network 130. Control system 120 is discussed in further detail below with respect to FIG. 9, which can control the operation, automation, communication, etc. of automated item handling system 100.

In operation, incoming items 102 can be received by automated item handling system 100 from any upstream process or facility. For example, incoming items 102 may be received from a supplier, a manufacturer, another material handling facility, etc. via an inbound vehicle (e.g., truck). Accordingly, the items may have been offloaded from the vehicle in pallets and depalletized prior to induction into automated item handling system 100. Accordingly, incoming items 102 may arrive as freight, packaged in boxes, etc. Alternatively, incoming items 102 may be received in containers (e.g., totes, trays, bin, etc.) that may be used internally within an organization to ship and transport items. The offloading and depalletizing of incoming items 102 may be automated (e.g., performed by automated ground vehicles) or may be performed manually. Incoming items 102 can be received by automated item handling system 100 from any other type of upstream process as well.

After offloading and depalletizing, incoming items 102 may be received by automated item handling system 100. For example, incoming items may be inducted into item singulation stations 104-1, 104-2, and/or 104-3. This can include intake of incoming items 102, which can include scanning of barcodes associated with incoming items 102, reading of RFID sensors, images of incoming items 102, weight of incoming items 102, etc. In implementations where incoming items 102 include loose items, incoming items 102 can be deposited into a hopper of item singulation stations 104-1, 104-2, and/or 104-3, which can then be transferred to a conveyance of item singulation stations 104-1, 104-2, and/or 104-3. Alternatively, a box of items can be provided to item singulation stations 104-1, 104-2, and/or 104-3, and item singulation stations 104-1, 104-2, and/or 104-3 can include components to open the box and empty the items from the box onto a conveyance of item singulation stations 104-1, 104-2, and/or 104-3. According to yet another aspect of the present disclosure, a container (e.g., a tote, a bin, a tray, etc.) of items can be provided to item singulation stations 104-1, 104-2, and/or 104-3, and item singulation stations 104-1, 104-2, and/or 104-3 can include components to empty the container onto a conveyance of item singulation stations 104-1, 104-2, and/or 104-3. For example, item singulation stations 104-1, 104-2, and/or 104-3 can include a cutter and/or articulating/rotating elements (e.g., a platform, engaging arms, etc.) to flip/turn over a box or a tote to empty its contents.

Once the items are placed on the conveyance of item singulation stations 104-1, 104-2, and/or 104-3, the items can be singulated by item singulation stations 104-1, 104-2, and/or 104-3. For example, item singulation stations 104-1, 104-2, and/or 104-3 can separate each of the incoming items 102 to have a certain gap distance between each item and arrange each of the incoming items 102 in a straight line. According to certain exemplary embodiments, item singulation stations 104-1, 104-2, and/or 104-3 can include a waterfall arrangement of cascading conveying elements. One exemplary implementation of item singulation stations 104-1, 104-2, and/or 104-3 is discussed further in connection with FIG. 2.

After item singulation stations 104-1, 104-2, and/or 104-3 have separated and arranged incoming items 102, the singulated incoming items 102 can be provided to universal item sorters 106-1, 106-2, and/or 106-3. According to aspects of the present disclosure, universal item sorters 106-1, 106-2, and/or 106-3 are disposed adjacent to item singulation stations 104-1, 104-2, and/or 104-3 such that the singulated items can pass directly from item singulation stations 104-1, 104-2, and/or 104-3 to universal item sorters 106-1, 106-2, and/or 106-3 without any manual handling of the singulated items. The interface between item singulation stations 104-1, 104-2, and/or 104-3 and universal item sorters 106-1, 106-2, and/or 106-3 is discussed in further detail in connection with FIGS. 4A and 4B.

Further, each item singulation station 104-1, 104-2, and/or 104-3 can provide singulated items to one or more universal item sorters 106-1, 106-2, and/or 106-3. Alternatively, multiple universal item sorters 106-1, 106-2, and/or 106-3 can provide singulated items from a single item singulation station 104. Universal item sorters 106-1, 106-2, and/or 106-3 may be a cross-belt shuttle sorter that sorts singulated products into containers or totes. Universal item sorters 106-1, 106-2, and/or 106-3 may be capable of sorting at a rate of 2,100 units per hour. In other embodiments, the sorting rate may be higher or lower. Certain universal item sorters 106-1, 106-2, and/or 106-3 may be configured to handle items of up to five pounds, ten pounds, twenty pounds, or more in some instances. Universal item sorters 106-1, 106-2, and/or 106-3 may operate as a high-speed, high-destination sort solution that intakes items or packages and sorts them into containers using a shuttle that travels vertically and horizontally inside the machine (or outside in some instances). Universal item sorters 106-1, 106-2, and/or 106-3 may be item sorting systems, and may include a number of, such as two or more, modular sorting machines coupled in series, or otherwise adjacent to each other and connected.

Figure 2:
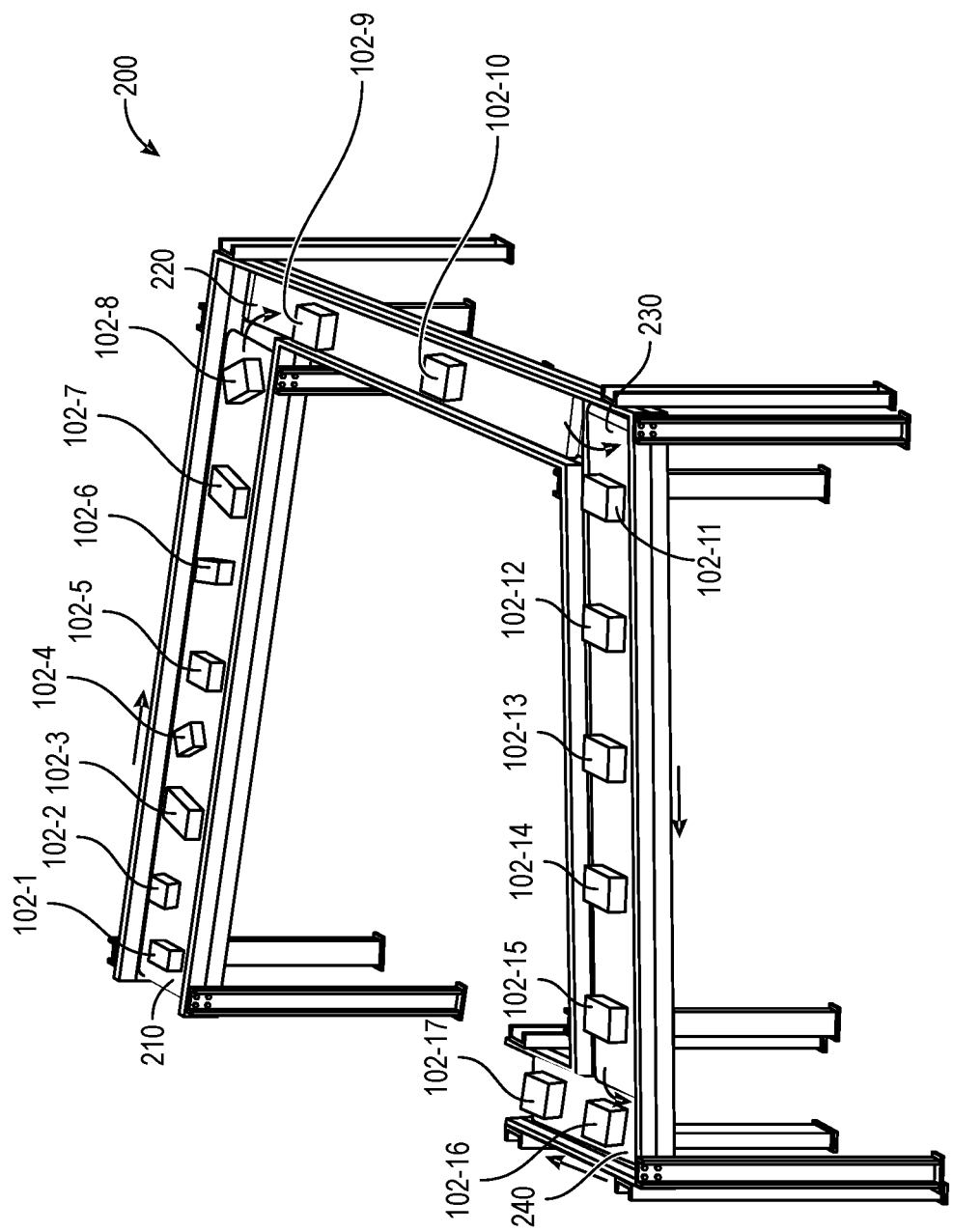
FIG. 2 is a partial schematic illustration of an exemplary item singulation station, in accordance with embodiments of the present disclosure.

FIG. 2 shows a partial schematic illustration of an exemplary item singulation station 200 in accordance with embodiments of the present disclosure. Item singulation station 200 shown in FIG. 2 can represent one exemplary implementation of item singulation stations 104-1, 104-2, and/or 104-3 and can facilitate automated singulation (e.g., moving, separating, arranging, spacing, and/or presenting) of incoming items 102 in preparation for further downstream processes such as sortation.

As shown in FIG. 2, item singulation station 200 can include one or more layers of cascading conveyors 210 and 220 that may move, separate, arrange, and/or present one or more items deposited thereon. According to certain exemplary embodiments, singulation of the received items can include arranging the items in a substantially straight line. For example, item singulation station 200 may receive items (e.g., from a container, a box, etc.), which may first be transported to conveyor 210. Conveyor 210 may move and/or separate one or more items 102-1, 102-2, 102-3, 102-4, 102-5, 102-6, 102-7, 102-8 toward conveyor 220, which may overlap conveyor 210, be disposed below conveyor 210, and be arranged at an angle (e.g., 10°, 30°, 45°, 60°, 90°, etc.) relative to conveyor 210. As items transition from conveyor 210 to conveyor 220, the items may be moved, arranged, and/or separated as desired. Further, conveyors 210 and 220 may move at various speeds, directions, durations, and/or patterns. For example, conveyor 210 may move at a slower speed than conveyor 220. According to aspects of the present disclosure, the relative speeds of conveyor 210 and conveyor 220 can be adjusted depending on the singulation of items that is desired.

As shown in FIG. 2, item singulation station 200 can include more than one layer of cascading conveyors 210 and 220. For example, conveyor 220 may move and/or separate one or more items 102-9 and 102-10 as they are transported toward conveyor 230. Conveyor 230 may overlap conveyor 220, be disposed below conveyor 220, and be arranged at an angle (e.g., 10°, 30°, 45°, 60°, 90°, etc.) relative to conveyor 220. As items transition from conveyor 220 to conveyor 230, the items may be further moved, arranged, and/or separated as desired. According to certain aspects of the present disclosure and as shown in FIG. 2, the items may be arranged in a straight line. Further, conveyor 220 and 230 may move at various speeds, directions, durations, and/or patterns. For example, conveyor 220 may move at a slower speed than conveyor 230. Alternatively, conveyor 230 may move at a slower speed than conveyor 220, or conveyor 220 and conveyor 230 may move at the same speed. According to aspects of the present disclosure, the relative speeds of conveyor 220 and conveyor 230 can be adjusted depending on the singulation of items that is desired. Adjusting the relative speeds of conveyors 210, 220, 230, and 240, can, for example, adjust the singulation of the items. For example, different relative speeds of conveyors 210, 220, 230, and 240 can provide different gap distances between the items, affect the arrangement of the items (e.g., in a straight line, etc.), etc.

As shown in FIG. 2, conveyor 230 may move and/or separate one or more items 102-11, 102-12, 102-13, 102-14, 102-15 toward conveyor 240. Conveyor 240 may overlap conveyor 230, be disposed below conveyor 230, and be arranged at an angle (e.g., 10°, 30°, 45°, 60°, 90°, etc.) relative to conveyor 230. As items transition from conveyor 230 to conveyor 240, the items may be further moved, arranged, and/or separated (e.g., to include a desired gap between items, etc.) as desired. Further, conveyor 230 and 240 may move at various speeds, directions, durations, and/or patterns. For example, conveyor 230 may move at a slower speed than conveyor 240. Alternatively, conveyor 240 may move at a slower speed than conveyor 230, or conveyor 240 and conveyor 230 may move at the same speed. According to aspects of the present disclosure, the relative speeds of conveyor 230 and conveyor 240 can be adjusted depending on the singulation of items that is desired.

Item singulation station 200 can also include other various features and components (e.g., paddles, curved features, angled features, additional conveyors, etc.) to facilitate automated singulation of the items. Further, item singulation station 200 can also include various sensors (e.g., optical, scanners, RFID, scales, mechanical, pressure, etc.) to identify, inventory, track, monitor, etc., the items that are being singulated by item singulation station 200, as well as the operation (e.g., monitor blockages, interruptions, etc.) of item singulation station 200. Accordingly, the sensor information can be provided as feedback to control system 120 to ensure proper operation of item singulation station 200. Various exemplary item singulation systems and methods are described in further detail in U.S. patent application Ser. No. 16/391,030, filed on Apr. 22, 2019, and U.S. patent application Ser. No. 15/464,087, filed on Mar. 20, 2017, which are both hereby incorporated by reference in their entireties.

Figure 3:
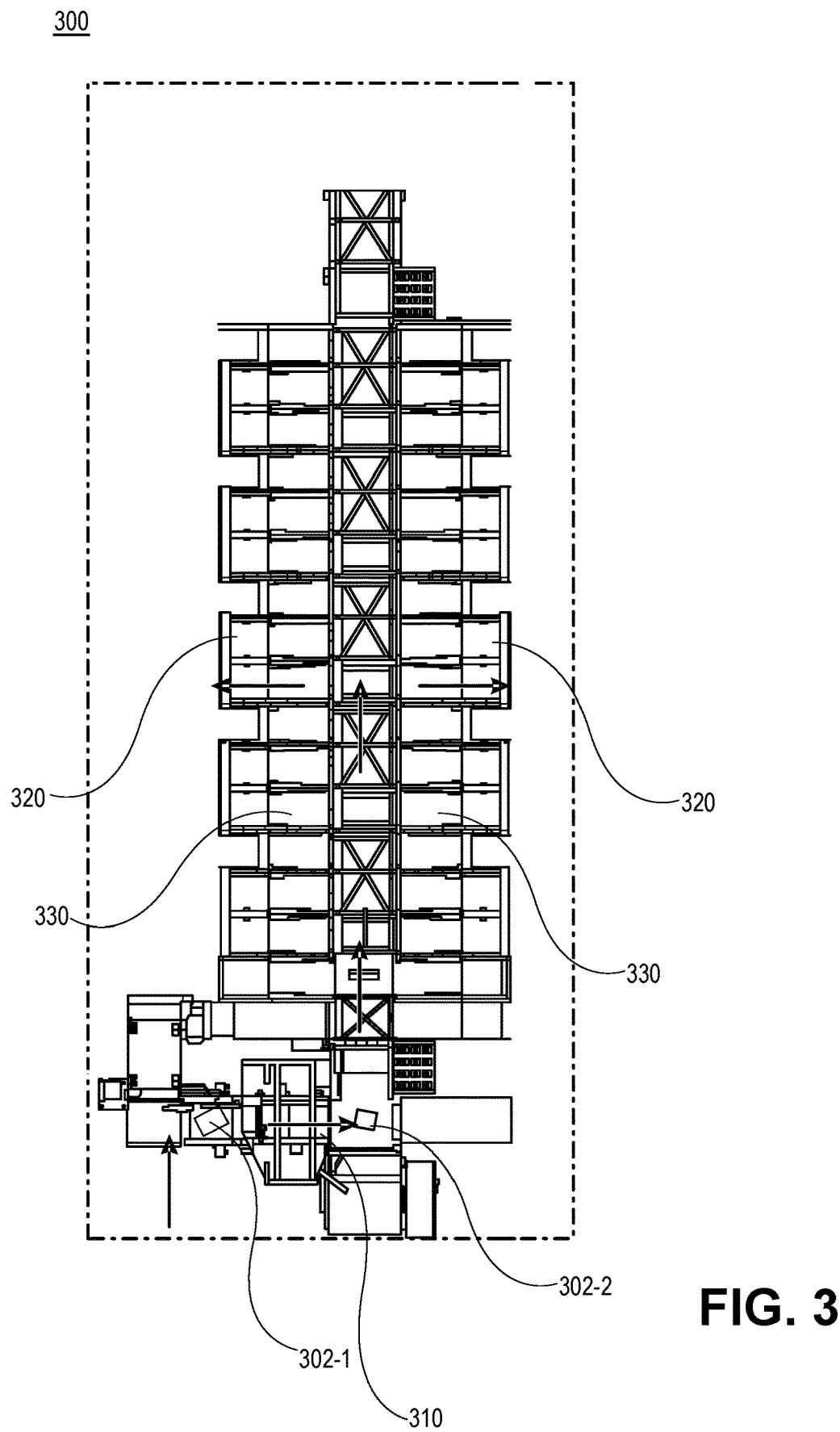
FIG. 3 is a schematic illustration of an exemplary universal item sorter, in accordance with embodiments of the present disclosure.

FIG. 3 shows an overhead schematic illustration of exemplary universal item sorter 300. Universal item sorter 300 shown in FIG. 3 can represent one exemplary implementation of universal item sorters 106-1, 106-2, and/or 106-3 (or universal item sorters 506-1, 506-2, and/or 506-3 described below). Universal item sorter 300 can receive singulated items (e.g., from item singulation station 104 or 200) and automatically sort the items into a plurality of containers (e.g., trays, bins, totes, etc.). According to certain embodiments, universal item sorter 300 can be disposed in any adjacent arrangement to item singulation station 200 such that the singulated items can pass directly from item singulation station 200 to universal item sorter 300 without any manual handling of the singulated items. For example, universal item sorter 300 and item singulation station 200 can be arranged in a substantially parallel orientation. Alternatively, universal item sorter 300 and item singulation station 200 can be oriented at an angle (e.g., 15°, 30°, 45°, 60°, 90°, or any other angle) relative to each other.

As shown in FIG. 3, universal item sorter 300 can include conveyor 310, onto which singulated items 302-1 and 302-2 may be received. As singulated items 302-1 and 302-2 are transported by conveyor 310, singulated items 302-1 and 302-2 may be sorted into a respective one container from an array of containers 320 disposed on both sides of conveyor 310. For example, universal item sorter 300 can include multiple chutes 330, where each chute directs the items being sorted into a corresponding bin. Accordingly, as singulated items 302-1 and 302-2 are transported by conveyor 310, they may be diverted down one of the chutes 330, which may direct singulated items 302-1 and 302-2 into one of the array of containers 320. The items may be sorted such that items with a common destination are grouped into a single container. Alternatively, items may be sorted based on other downstream processes or requirements (e.g., item type, item size, etc.). Various exemplary item sortation systems and methods are described in further detail in U.S. patent application Ser. No. 16/382,410, filed on Apr. 12, 2019 and U.S. patent application Ser. No. 16/442,635, filed on Jun. 17, 2019, which are both hereby incorporated by reference in their entireties.

Figure 4A:
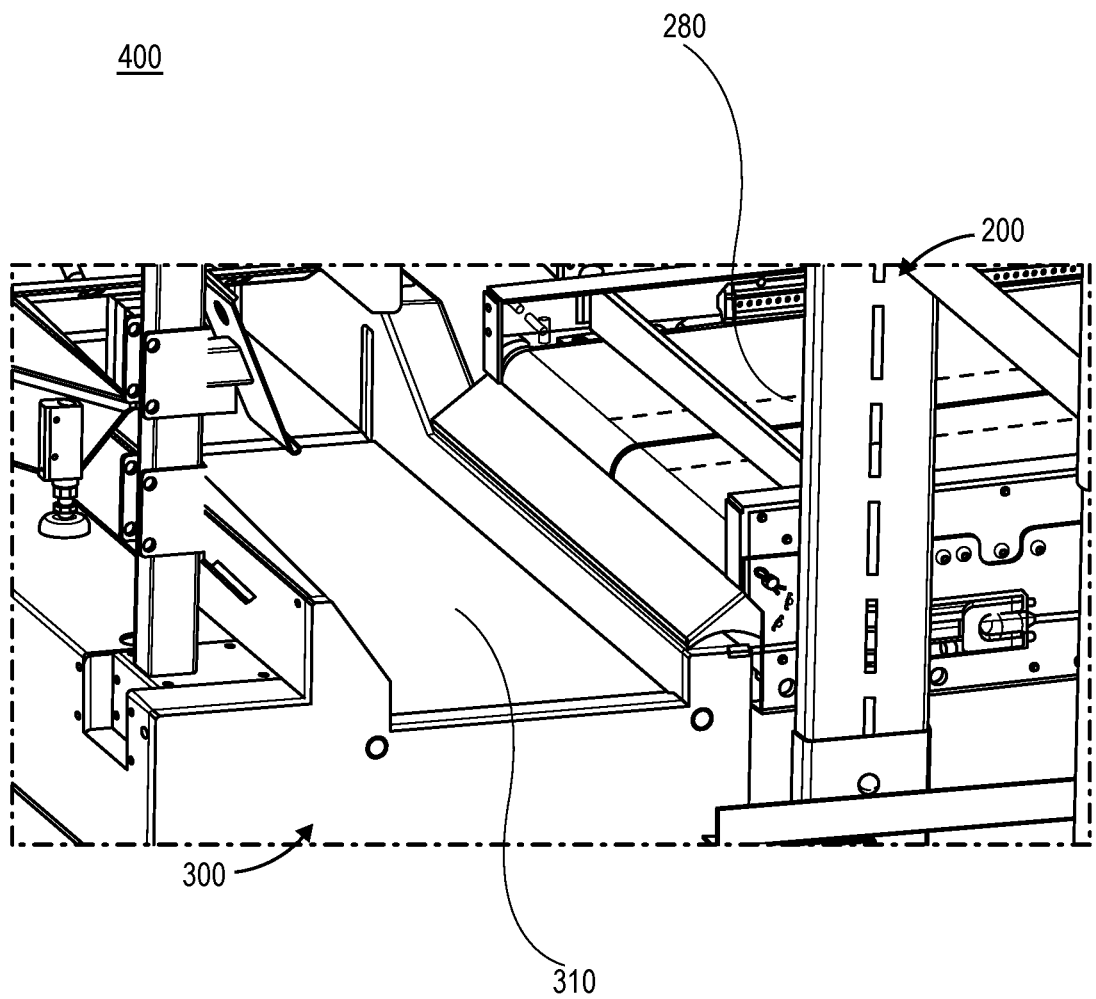
FIGS. 4A and 4B are schematic illustrations of an exemplary interface, in accordance with embodiments of the present disclosure.
Figure 4B:
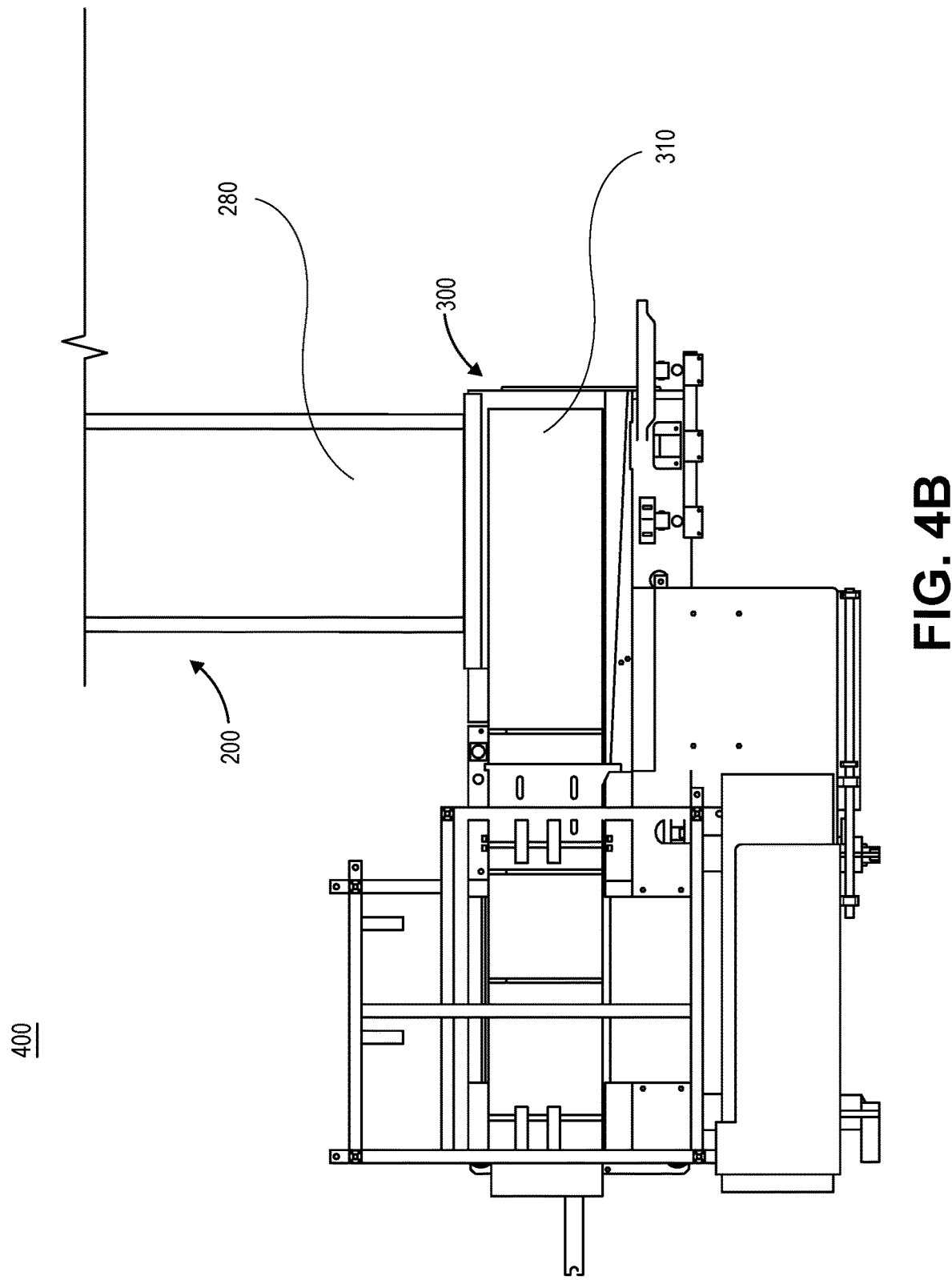

FIGS. 4A and 4B show an exemplary interface 400 between item singulation station 200 (e.g., item singulation stations 104-1, 104-2, and/or 104-3) and universal item sorter 300 (e.g., universal item sorters 106-1, 106-2, and/or 106-2). Interface 400 can facilitate automated direct transfer of singulated items from singulation station 200 to universal item sorter 300. FIG. 4A is a partial perspective view illustration of interface 400 and FIG. 4B is an overhead view of interface 400.

As shown in FIGS. 4A and 4B, items that have been singulated by item singulation station 200 can be provided directly to universal item sorter 300 via interface 400. For example, universal item sorter 300 can be disposed in an adjacent arrangement to item singulation station 200 such that the singulated items can pass directly from item singulation station 200 to universal item sorter 300 without any manual handling of the singulated items. For example, the singulated items can be provided directly by conveyor 280 of item singulation station 200 to conveyor 310 of universal item sorter 300.

As shown in FIGS. 4A and 4B, the transfer of singulated items from item singulation station 200 to universal item sorter 300 is preferably fully automated and requires no manual intervention. Further, the interface between singulation station 200 and universal item sorter 300 can include various sensors, such as optical sensors, pressure sensors, scanners, etc. to ensure that the items are being properly transferred from singulation station 200 to universal item sorter 300. The sensor information can be provided to control system 120 as a feed back to ensure proper operation of the transfer from singulation station 200 to universal item sorter 300.

Further, although conveyor 280 and conveyor 310 are shown arranged in a substantially perpendicular (e.g., 90°) orientation relative to each other, conveyor 280 and conveyor 310 can be arranged at any relative orientation. For example, conveyor 280 and conveyor 310 can be arranged substantially in a line such that items transferred from conveyor 280 to conveyor 310 travel substantially in a straight line. Alternatively, conveyor 280 can be arranged at any angle (e.g., 15°, 30°, 45°, 60°, 90°, or any other angle) relative to conveyor 310.

FIG. 5 shows a block diagram of an exemplary automated item handling system 500 according to exemplary embodiments of the present disclosure. Automated item handling system 500 is similar to automated item handling system 100 shown in FIG. 1, but includes additional downstream components.

As shown in FIG. 5, exemplary automated item handling system 500 can facilitate automated handling and processing of incoming items 502. According to exemplary embodiments of the present disclosure, automated item handling system 500 can include one or more item singulation stations 504-1, 504-2, 504-3, one or more universal item sorters 506-1, 506-2, 506-3, one or more container handling systems 508-1, 508-2, 508-3, one or more item packing stations 510-1, 510-2, 510-3, and control system 520. The various systems of automated item handling system 500 can be implemented at item handling facilities to process incoming items. For example, the items can be received by automated item handling system 500 from upstream facilities or processes (e.g., an item supplier, from inventory, from a warehouse, etc.).

Although automated item handling system 500 is shown having three item singulation stations 504, three universal item sorters 506, three container handling systems 508, and three item packing stations 510, automated item handling system 500 can be implemented in a modular fashion to omit and/or include any number of any of item singulation stations 504, universal item sorters 506, container handling systems 508, and item packing stations 510. For example, the configuration of automated item handling system 500 can be customized based on the needs and requirements of the facility in which automated item handling system 500 may be implemented.

Automated item handling system 500 can also include control system 520, which can communicate with item singulation stations 504, universal item sorters 506, container handling systems 508, and item packing stations 510 via network 530. For example, network 530 can include any wired or wireless network (e.g., cellular, satellite, Bluetooth, Wi-Fi, etc.) such as a local area network, wide area network, etc. that can facilitate communications between item singulation stations 504, universal item sorters 506, container handling systems 508, and item packing stations 510 and control system 520. Item singulation stations 504, universal item sorters 506, container handling systems 508, and item packing stations 510 and control system 520 can transmit data and other information, including one or more instructions, data, sensor information, commands, etc., via network 530. Control system 520 is discussed in further detail below with respect to FIG. 9, which can control the operation, automation, communication, etc. of automated item handling system 500.

In operation, incoming items 502 can be received by automated item handling system 500 from any upstream process or facility. For example, incoming items 502 may be received from a supplier, a manufacturer, another material handling facility, etc. via an inbound vehicle (e.g., truck). Accordingly, the items may have been offloaded from the vehicle in pallets and depalletized prior to induction into automated item handling system 500. Accordingly, incoming items 502 may arrive as freight, packaged in boxes, etc. Alternatively, incoming items 502 may be received in containers (e.g., totes, trays, bin, etc.) that may be used internally within an organization to ship and transport items. The offloading and depalletizing of incoming items 502 may be automated (e.g., performed by automated ground vehicles) or may be performed manually.

After offloading and depalletizing, incoming items 502 may be received by automated item handling system 500. For example, incoming items may be inducted into item singulation stations 504-1, 504-2, and/or 504-3. This can include intake of incoming items 502, which can include scanning of barcodes associated with incoming items 502, reading of RFID sensors, images of incoming items 502, weight of incoming items 502, etc. In implementations where incoming items 502 include loose items, incoming items 502 can be deposited into a hopper of item singulation stations 504-1, 504-2, and/or 504-3, which can then be transferred to a conveyance of item singulation stations 504-1, 504-2, and/or 504-3. Alternatively, a box of items can be provided to item singulation stations 504-1, 504-2, and/or 504-3, and item singulation stations 504-1, 504-2, and/or 504-3 can include components to open the box and empty the items from the box onto a conveyance of item singulation stations 504-1, 504-2, and/or 504-3. According to yet another aspect of the present disclosure, a container (e.g., a tote, a bin, a tray, etc.) of items can be provided to item singulation stations 504-1, 504-2, and/or 504-3, and item singulation stations 504-1, 504-2, and/or 504-3 can include components to empty the container onto a conveyance of item singulation stations 504-1, 504-2, and/or 504-3.

Once the items are placed on the conveyance of item singulation stations 504-1, 504-2, and/or 504-3, the items can be singulated by item singulation stations 504-1, 504-2, and/or 504-3. For example, item singulation stations 504-1, 504-2, and/or 504-3 can separate each of the incoming items 502 to have a certain gap distance between each item and arrange each of the incoming items 502 in a straight line. According to certain exemplary embodiments, item singulation stations 504-1, 504-2, and/or 504-3 can include a waterfall arrangement of cascading conveying elements.

After item singulation stations 504-1, 504-2, and/or 504-3 have separated and arranged incoming items 502, the singulated incoming items 502 can be provided to universal item sorters 506-1, 506-2, and/or 506-3. According to aspects of the present disclosure, each item singulation station 504-1, 504-2, and/or 504-3 can provide singulated items to one or more universal item sorters 506-1, 506-2, and/or 506-3. Alternatively, multiple universal item sorters 506-1, 506-2, and/or 506-3 can provide singulated items from a single item singulation station 504. Universal item sorters 506-1, 506-2, and/or 506-3 may be a cross-belt shuttle sorter that sorts singulated products into containers or totes. Universal item sorters 506-1, 506-2, and/or 506-3 may be capable of sorting at a rate of 2,100 units per hour. Certain universal item sorters 506-1, 506-2, and/or 506-3 may be configured to handle items of up to five pounds, ten pounds, twenty pounds, or more in some instances. Universal item sorters 506-1, 506-2, and/or 506-3 may operate as a high-speed, high-destination sort solution that intakes items or packages and sorts them into containers using a shuttle that travels vertically and horizontally inside the machine (or outside in some instances). Universal item sorters 506-1, 506-2, and/or 506-3 may be item sorting systems, and may include a number of, such as two or more, modular sorting machines coupled in series, or otherwise adjacent to each other and connected.

Once universal item sorters 506-1, 506-2, and/or 506-3 have sorted incoming items 502 into a plurality of containers, container handling systems 508-1, 508-2, and/or 508-3 can retrieve and process the containers holding sorted incoming items 502. According to certain aspects of the present disclosure, each universal item sorter 506-1, 506-2, and/or 506-3 can include a respective container handling system 508-1, 508-2, and/or 508-3. Alternatively, each universal item sorter 506-1, 506-2, and/or 506-3 can include more than one container handling system 508-1, 508-2, and/or 508-3, or one container handling system 508-1, 508-2, and/or 508-3 can service more than one universal item sorter 506-1, 506-2, and/or 506-3. Container handling system 508-1, 508-2, and/or 508-3 can include a robotic system that is able detect full containers, retrieve the containers, and transport the full containers from the universal item sorters 506-1, 506-2, and/or 506-3 to a downstream system or process (e.g., an item packing station). For example, a container can be determined to be full based on volume, weight, quantity, etc. After transporting the full container from universal item sorters 506-1, 506-2, and/or 506-3 to a downstream system or process, container handling system 508-1, 508-2, and/or 508-3 can replace the transported full container in the universal item sorter with an empty container.

According to certain aspects of the present disclosure, the full container can be engaged by container handling system 508-1, 508-2, and/or 508-3 and placed on a conveyance that may transport the full container to a downstream system or process, such as item packing stations 510-1, 510-2, and/or 510-3. Item packing stations 510-1, 510-2, and/or 510-3 can pack the containers, which are holding incoming items 502, in preparation for the next downstream process or system. For example, item packing stations 510-1, 510-2, and/or 510-3 can pack the containers into pallets for shipment to another material handling facility. Alternatively, incoming items 502 in the containers can be packed into boxes, envelopes, or other shipping materials for shipping to the end consumer. As with the other components, the exemplary systems and methods according to embodiments of the present disclosure can include one or more item packing stations 510-1, 510-2, and/or 510-3. For example, each container handling system 508-1, 508-2, and/or 508-3 can include a respective item packing station 510-1, 510-2, and/or 510-3. Alternatively, each container handling system 508-1, 508-2, and/or 508-3 can include more than one item packing station 510-1, 510-2, and/or 510-3, or one container handling system 508-1, 508-2, and/or 508-3 can service more than one item packing station 510-1, 510-2, and/or 510-3.

Figure 6A:
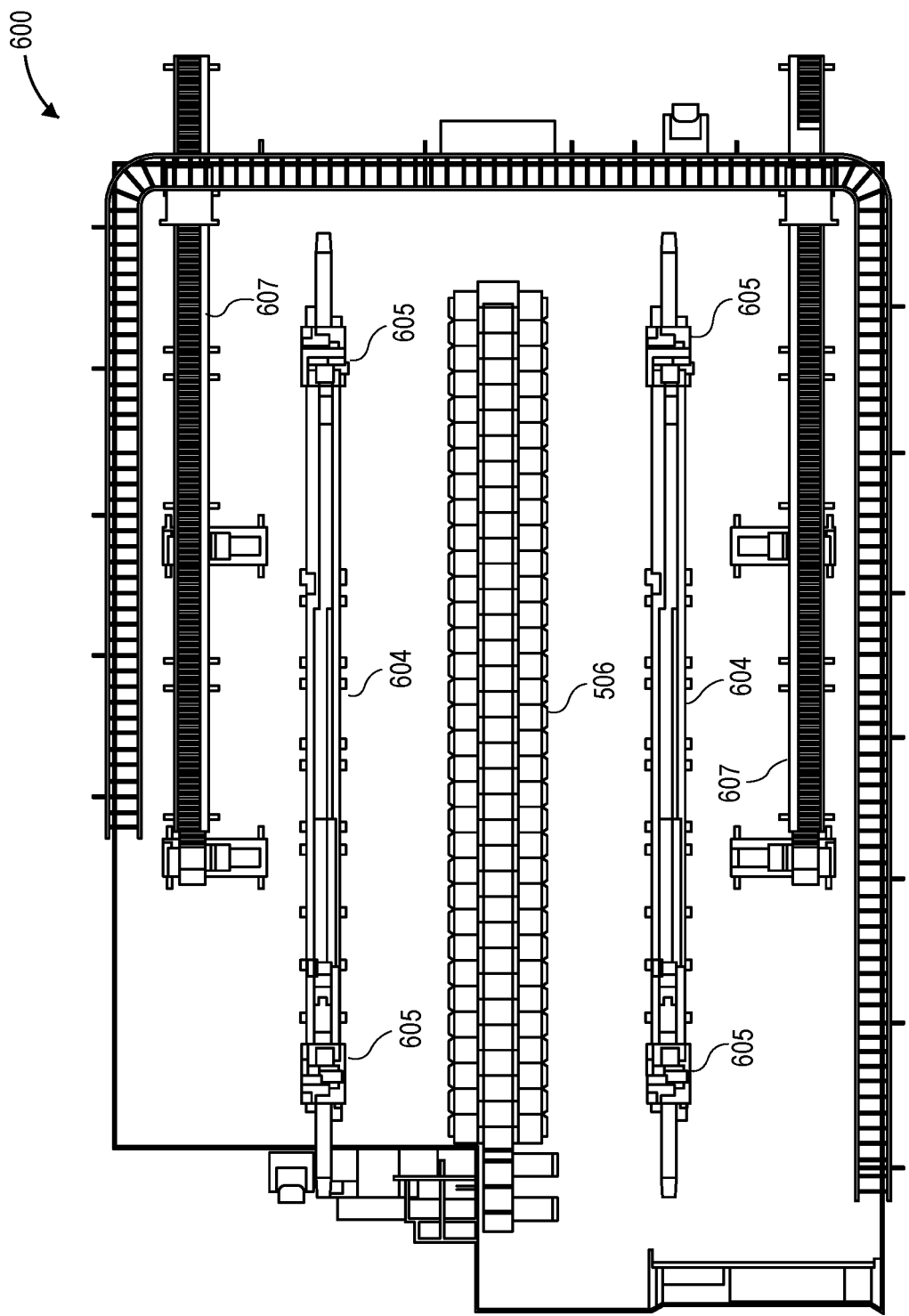
FIGS. 6A, 6B, and 6C are schematic illustrations of an exemplary container handling system, in accordance with embodiments of the present disclosure.
Figure 6B:
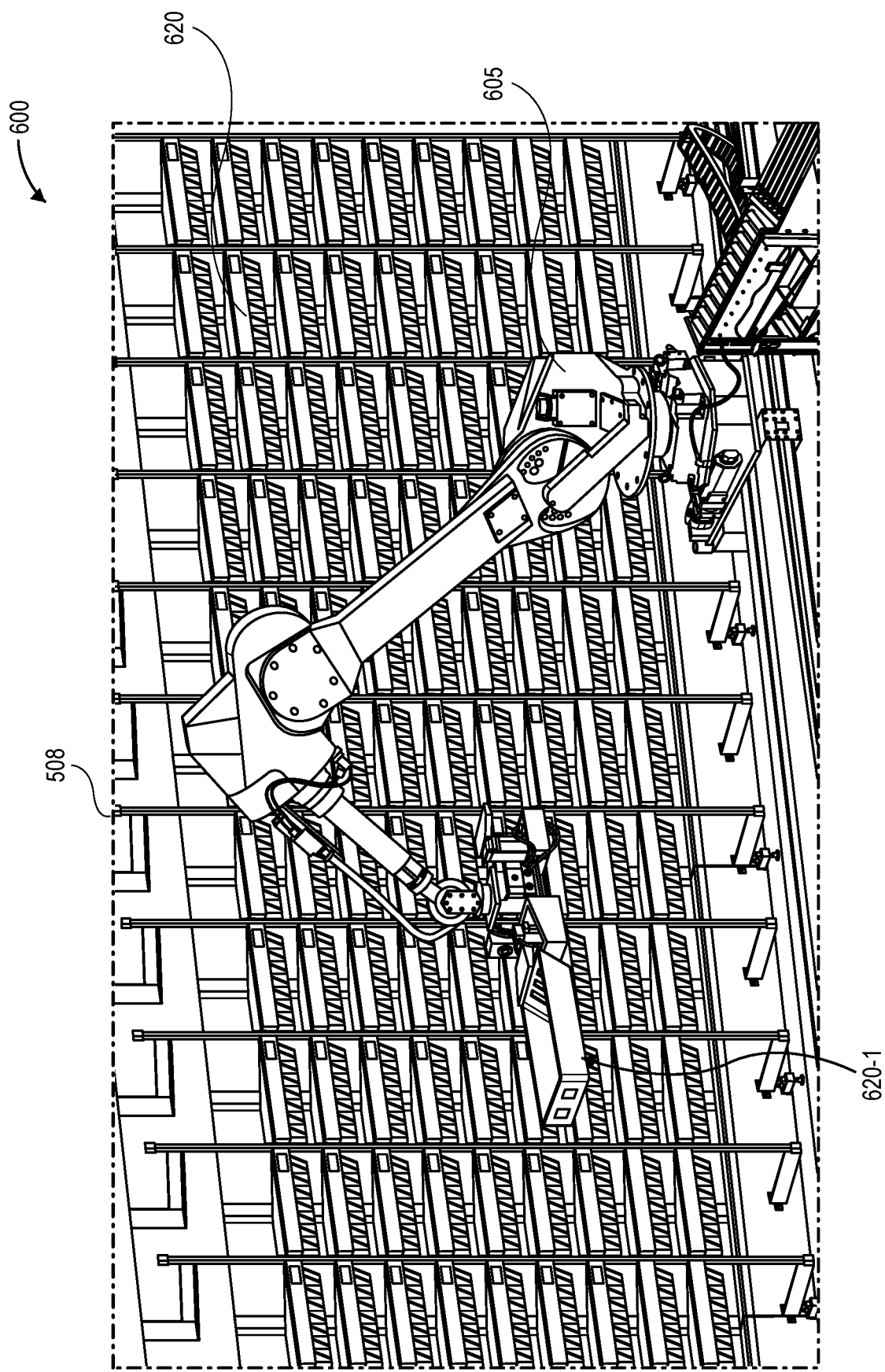
Figure 6C:
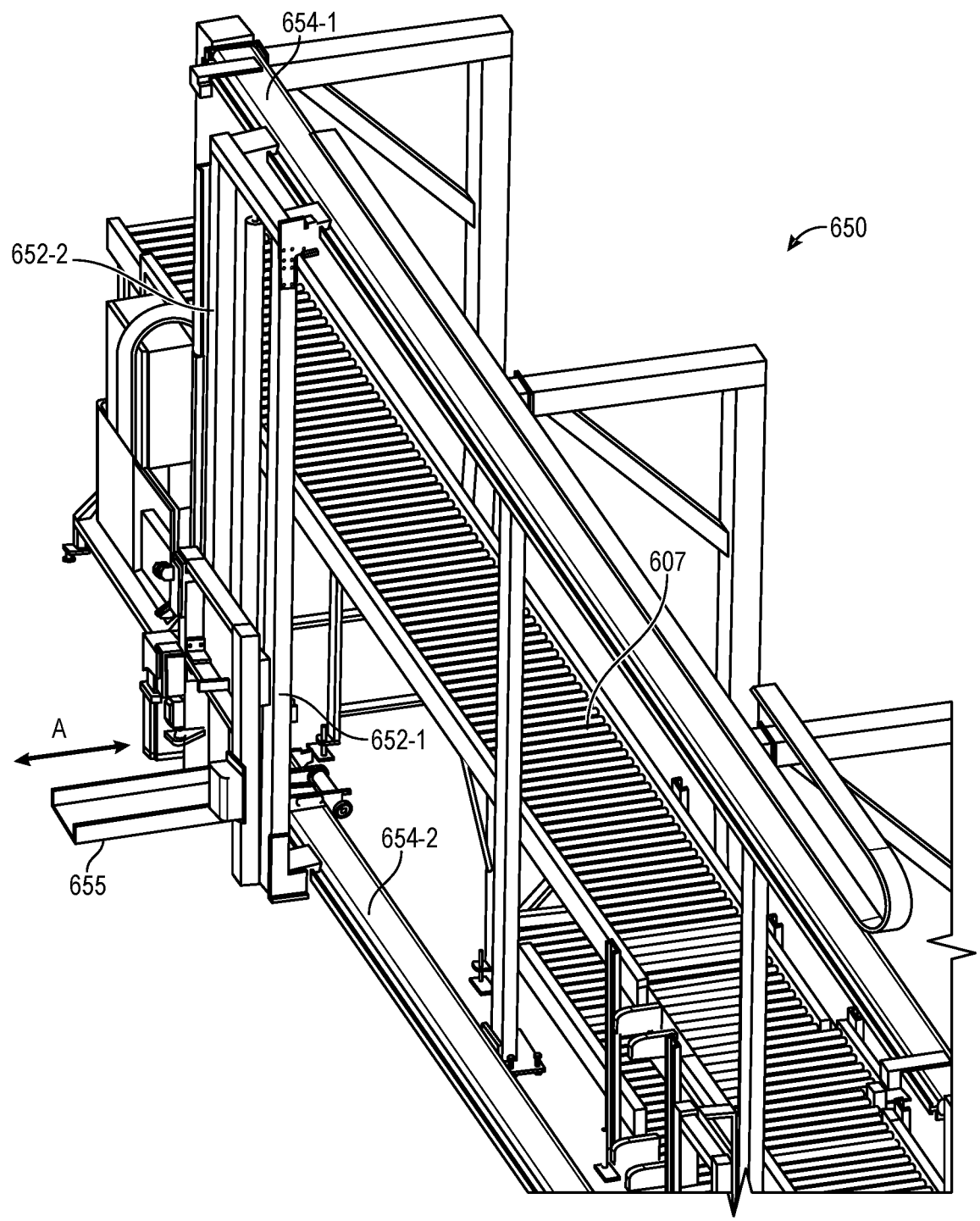

FIGS. 6A and 6B show an exemplary container handling system 600 and FIG. 6C shows an exemplary container handling system 650. Container handling system 600 and/or container handling system 650 can be associated with an item sortation system (e.g., universal item sorters 506-1, 506-2, and/or 506-3), according to exemplary embodiments of the present disclosure. Container handling systems 600 and 650 shown in FIGS. 6A-6C can represent one exemplary container handling systems 508-1, 508-2, and/or 508-3. FIG. 6A is an overhead schematic illustration of exemplary container handling system 600 and FIG. 6B is a partial illustration of exemplary container handling system 600. FIG. 6C is a partial illustration of exemplary container handling system 650. Container handling system 600 and container handling system 650 can, after the items have been sorted into containers, identify full containers (e.g., containers filled to capacity with sorted items by universal item sorter 506) in a universal item sorter and transport the full containers for further downstream processing and handling of the items and/or containers.

As shown in FIG. 6A, universal item sorter 506 may receive singulated items from various upstream stations or processes (e.g., from item singulation stations 504, via conveyors, slides, chutes, totes, containers, robotic drive units, other material handling equipment, or other automated or manual processes) and sort the received singulated items into one container of an array of containers. For example, each of the one or more sides of universal item sorter 506 may include the array of containers, and the singulated items may be sorted into one of the array of containers. Further, the array of containers may be individually placed and removed at respective container positions. According to certain aspects, universal item sorter 506 may sort received singulated items so that each container receives and holds items having a common destination.

Along each side of the array of containers of universal item sorter 506, container handling system 600 and/or container handling system 650 can include one or more robotic systems, machines, or apparatus, such as six-axis (e.g., translate in the X, Y, and Z directions and rotate about the X-axis, Y-axis, and Z-axis), three-axis (e.g., translate in the X, Y, and Z directions), multi-axis, or other types or configurations of robotic arms and/or gantry systems. Robotic arms 605 may be configured to move along respective rails 604, which may be substantially parallel to the respective sides or planes of the array of containers of universal item sorter 506, to access, engage, and manipulate the containers. For example, robotic arms 605 may move or translate in either direction along the rails 604 to be able to reach, access, engage, and manipulate the containers contained in the array of universal item sorter 506. Similarly, gantry 655 may be configured to move along rails 652-1, 652-2, 654-1, and 654-2, which may be substantially adjacent to the respective sides or planes of the array of containers of universal item sorter 506, to access, engage, and manipulate the containers. For example, gantry 655 may move or translate in either direction along the rails 654-1 and 654-2 and vertically along rails 652-1 and 652-2 to be able to reach, access, engage, and manipulate the containers contained in the array of universal item sorter 506. Additionally, gantry 655 can also move in a direction toward (and away from) the array of containers of universal item sorter 506. According to aspects of the present disclosure, robotic arms 605 and gantry 655 can access and engage with the containers to remove full containers from the array of containers of universal item sorter 506 and replace the removed full containers with empty containers.

Adjacent to rails 604 and/or 654 and associated with one or more robotic arms 605 and/or gantry 655 may be one or more conveyors 607. Robotic arms 605 and/or gantry 655 may remove filled containers from the array of containers of universal item sorter 506 and place them on conveyors 607 so that they may be transported to further downstream processes and systems. For example, conveyors 607 may transport the filled containers placed on conveyors 607 to a downstream process such as one of item packing stations 510-1, 510-2, and/or 510-3. Additionally, conveyors 607 may transport empty containers from elsewhere in the material handling facility processes to container handling system 600 so that robotic arms 605 and/or gantry 655 can replace the removed filled containers with an empty container. According to certain aspects of the present disclosure, conveyors 607 can be one, two, or multi-tiered conveyors, with each tier or level configured to move and transport containers to different downstream destinations. For example, each tier or level of conveyors 607 may transport full containers to a respective item packing station 510. Alternatively, one tier or level of conveyor 607 may transport full containers to inventory or other downstream processes, systems, and/or facilities. Additionally, one tier or level of conveyor 607 may transport empty containers from other systems and processes to container handling system 600 and/or container handling system 650.

In operation, each container position may include one or more sensors (e.g., weight/pressure sensors, optical sensors, etc.) that can detect when each respective container is full. Once a full container is detected, robotic arm 605 and/or gantry 655 may engage the full container and remove the full container from universal item sorter 506 and place the full container onto conveyors 607 so that it can be transported to further downstream processes. The detection of full containers, as well as the movements of robotic arm 605 and/or gantry 655, may be controlled by control system 520, via the transmission and receiving of data, information, instructions, commands, and the like.

Although FIG. 6A shows a particular number, arrangement, and configuration of components of an automated container handling system, the container handling system may include other numbers, arrangements, and configurations of various components. For example, a plurality of universal item sorters may be included, the item universal item sorters may have one, two, three, or other numbers of sides associated with respective containers and container positions, one, two three, or other numbers of rails may be included, each rail may include various numbers of robotic arms, and various numbers of conveyors having one, two, three, or other numbers of tiers or levels may be included.

FIG. 6B shows a partial view of exemplary container handling system 600 according to embodiments of the present disclosure. As shown in FIG. 6B, universal item sorter may include a plurality of containers 620 associated with a respective plurality of container positions. A robotic system such as a robotic arm 605 may be configured to move along a rail 604 that extends adjacent and substantially parallel to the plurality of containers and container positions of universal item sorter 506. In addition, conveyor 607 (FIG. 6A), such as a two-tier conveyor, may be positioned adjacent to rail 604 and associated robotic arm 605 to transport empty containers from upstream stations or processes to robotic arm 605, and to transport full containers from container handling system 600 to downstream stations or processes (e.g., item packing stations 510).

As shown in FIG. 6B, robotic arm 605 is engaged with container 620-1. For example, container 620-1 may be a container that was filled with sorted items by universal item sorter 506. Accordingly, after it was detected that container 620-1 was full, robotic arm 605 may have engaged and removed container 620-1 from universal item sorter 506. Next, robotic arm 605 may place container 620-1 onto conveyors 607 so that it may be transported to further downstream processes (e.g., item packing stations 510).

FIG. 6C shows a partial view of exemplary container handling system 650 according to embodiments of the present disclosure. As shown in FIG. 6B, universal item sorter 506 may include a plurality of containers 620 associated with a respective plurality of container positions. A robotic system such as gantry 655 may be configured to move along rails 652-1, 652-2, 654-1, and 654-2 that extend adjacent to the plurality of containers and container positions of universal item sorter 506 and facilitate the movement and translation in two directions (e.g., horizontally and vertically). Gantry 655 can also be moved toward and away from conveyor 607 (and the array of containers of universal item sorter 506), as denoted by arrow A in FIG. 6C. In addition, conveyor 607, such as a two-tier conveyor, may be positioned adjacent to rails 654-1 and 654-2 and associated gantry 655 to transport empty containers from upstream stations or processes to gantry 655, and to transport full containers from container handling system 650 to downstream stations or processes (e.g., item packing stations 510).

As shown in FIG. 6C, gantry 655 can engage any container 620 that may have been filled with sorted items by universal item sorter 506. Accordingly, after it was detected that any respective container 620 is full, gantry 655 can engage and remove the respective container 620 from universal item sorter 506. Next, gantry 655 may place the engaged container 620 onto conveyors 607 so that it may be transported to further downstream processes (e.g., item packing stations 510).

Various exemplary container handling systems and methods are described in further detail in U.S. patent application Ser. No. 16/532,863, filed on Aug. 6, 2019, which is hereby incorporated by reference in its entirety.

Figure 7A:
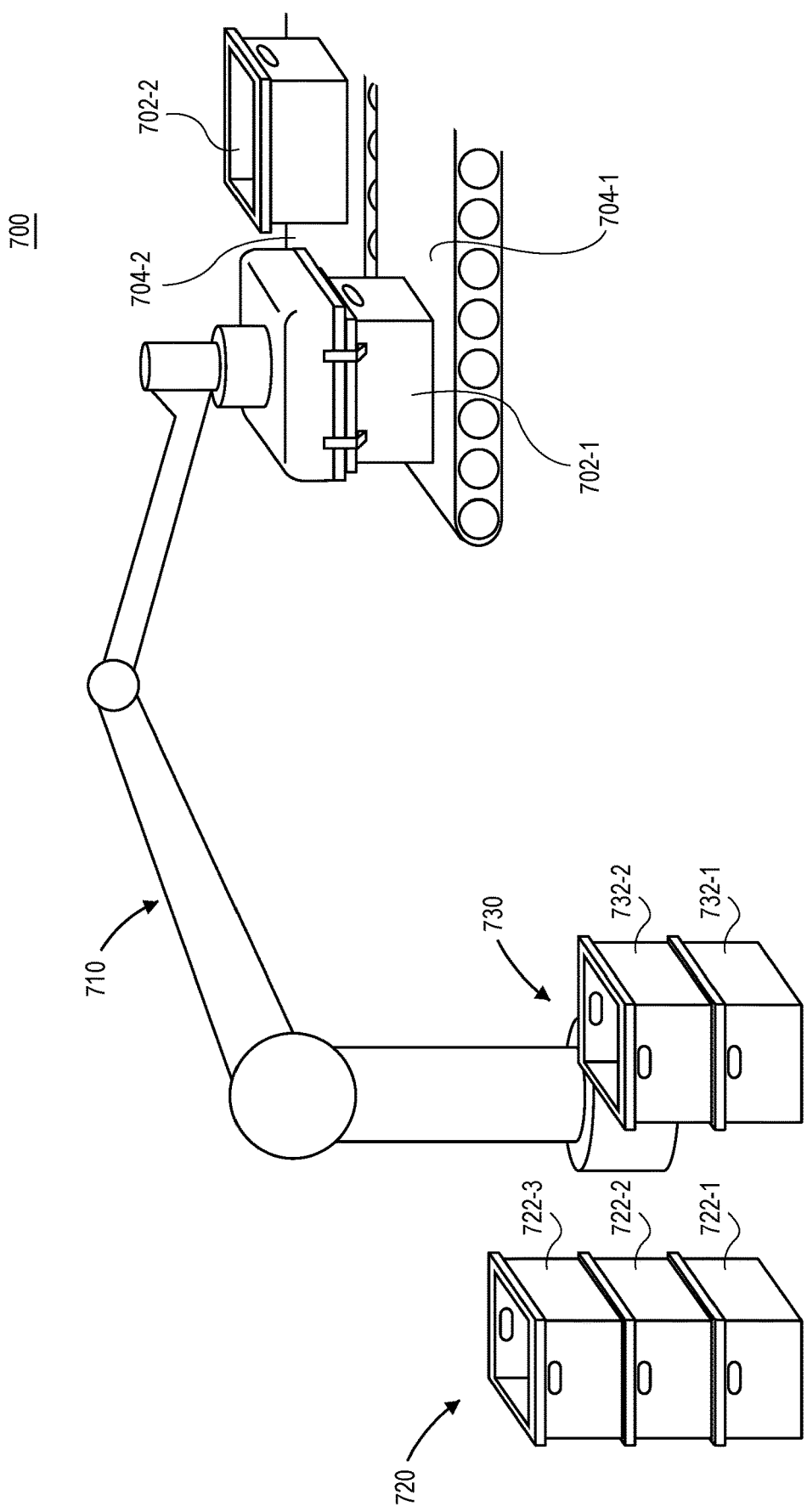

FIGS. 7A and 7B show an exemplary item packing station 700, according to exemplary embodiments of the present disclosure. According to embodiments of the present disclosure, item packing station 700 can receive the filled containers from container handling system 600 and pack the containers for further handling by downstream processes and systems in an automated manner.

As shown in FIGS. 7A and 7B, item packing station 700 can include robotic arm 710, which can engage incoming containers 702-1 and 702-2 and pack the containers in view of downstream processes and systems. Robotic arm 710 can include one or more robotic systems, machines, or apparatus, such as six-axis, multi-axis, or other types or configurations of robotic arms. According to one exemplary embodiment, item packing station 700 can automatically palletize the containers for transport to inventory, other item handling facilities, and/or other downstream processes/systems. Alternatively, item packing station 700 can pack the items held in containers 702-1 and 702-2 for shipping to end consumers.

As shown in FIGS. 7A and 7B, containers 702-1 and 702-2 are received by item packing station 700 from upstream processes and systems (e.g., container handling system 600) via conveyors 704-1 and 704-2. For example, conveyors 704-1 and 704-2 can be an end portion of conveyors 607 or can be in communication with conveyors 607 such that the filled containers handled by container handling system 600 are transported to item packing station 700. Once an incoming container (e.g., container 702-1) is detected by item packing station 700, robotic arm 710 can engage container 702-1 to facilitate packing of container 702-1. In FIGS. 7A and 7B, robotic arm 710 engages container 702-1 as it is received via conveyor 704-1 and arranges it on container stack 720.

Each of container stacks 720 and 730 can be arranged to form pallets. For example, robotic arm 710 can engage containers arriving on conveyors 704-1 and 704-2 and arrange the containers into container stacks to form pallets. As shown in FIGS. 7A and 7B, pallets are being formed by container stacks 720 and 730. Container stack 720 can include containers 722-1, 722-2, and 722-3, and container stack 730 can include containers 732-1 and 732-2. The containers may be organized in container stacks for palletization to group the containers having the same destination. Although FIGS. 7A and 7B show item packing station 700 arranging the containers into two pallets, any number of pallets (e.g., 3 pallets, 4 pallets, 5 pallets, 6 pallets, 7 pallets, 8 pallets, or more) can be formed. Once a pallet is completed, it can be secured (e.g., straps, plastic wrap, etc.) and transported from item packing station 700. For example, the completed pallets can be transported to inventory, loaded onto vehicles to be transported to other item handling facilities, or any other downstream process or system. According to aspects of the present disclosure, the transportation of the pallets can be performed by autonomous ground vehicles to further automate the handling process.

Additionally, item packing station 700 can include various sensors (e.g., optical, pressure, RFID tracking, etc.) to detect, identify, and palletize incoming containers. Further, control system 520 can be in communication with item packing station 700 to transmit and receive data, information, instructions, commands, and the like to ensure proper operation of item packing station 700.

Figure 8:
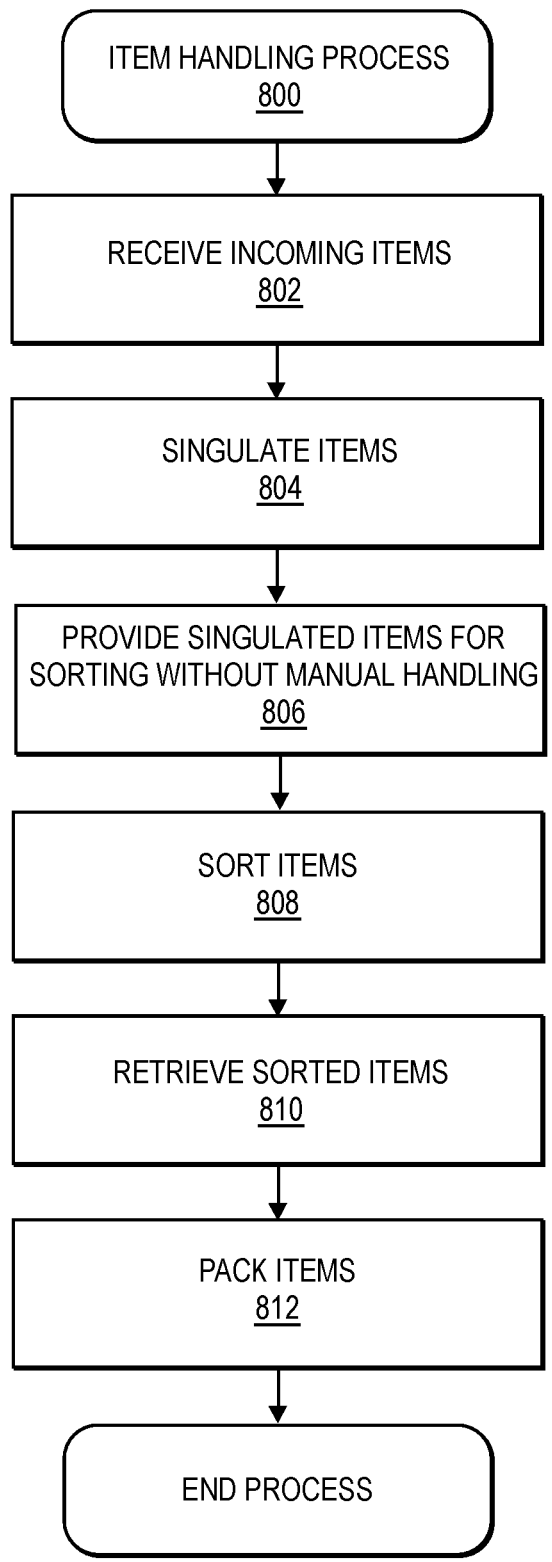
FIG. 8 is a flow diagram illustrating an exemplary item handling process, in accordance with embodiments of the present disclosure.

FIG. 8 is a flow diagram of an exemplary item handling process 800 in accordance with embodiments of the present disclosure.

As shown in FIG. 8, process 800 can begin with the receipt of incoming items, as in step 802. For example, the incoming items can include packages, boxes, containers, items, or other types of objects that may be received at a material handling facility, such as a cross dock, a fulfillment center, or other material handling facility for separation, singulation, sortation, packaging etc. for further downstream processes and systems. According to certain aspects of the present disclosure, the incoming items may be received by item singulation stations (e.g., item singulation stations 104, 200, or 504).

After the incoming items have been received, the incoming items may be singulated (e.g., by item singulations stations 104, 200, or 504), as in step 804. For example, singulation of the incoming items may include separating, arranging, processing, identifying, etc. items in preparation for sortation of the items.

In step 806, the singulated items can be provided for sortation without any manual handling. As described herein, the singulated items can be provided directly from an item singulation station to a universal item sorter (e.g., via interface 400) without any manual handling. For example, the item singulation station may be arranged adjacent to the universal item sorter such that the singulated items are directly provided from a conveyor of the item singulation station to a conveyor of the universal item sorter. Accordingly, this can reduce the space typically required by such systems by eliminating manual handling stations and/or runs of long conveyors.

After the singulated items have been provided for sorting, in step 808, the items may be sorted. This can be performed, for example, by a universal item sorter (e.g., universal item sorter 106, 300, or 506). According to aspects of the present disclosure, the items may be sorted by the universal item sorters into a plurality of containers (e.g., bins, trays, totes, etc.). The items may be sorted by the universal item sorters in accordance with any sortation scheme. For example, the items may be sorted based on the requirements of downstream processes and handling of the items, destination of the items, similarity of the items, size of the items, and/or any other motivation for sorting of the various items.

Once the items have been sorted into a plurality of containers, the sorted items can be retrieved (e.g., by container handling system 508, 600, or 650), as in step 810. For example, a container handling system can retrieve the sorted items from the universal item sorter and provide the containers to a downstream process or system (e.g., a packing station).

The container retrieved in step 810 can then be packed in step 812. For example, the container containing the sorted item can be packed or palletized (e.g., by packing station 510 or 700). The packing of the item can be performed in preparation for the next downstream process or system. For example, the item packing station can pack the containers into pallets for shipment to another material handling facility. Alternatively, the items in the containers can be packed into boxes, envelopes, or other shipping materials for delivery to the end consumer.

According to embodiments of the present disclosure, the exemplary item handling process 800 of handling of the item from receipt of the incoming item through packing of the item is preferably fully automated (without any manual intervention).

Figure 9:
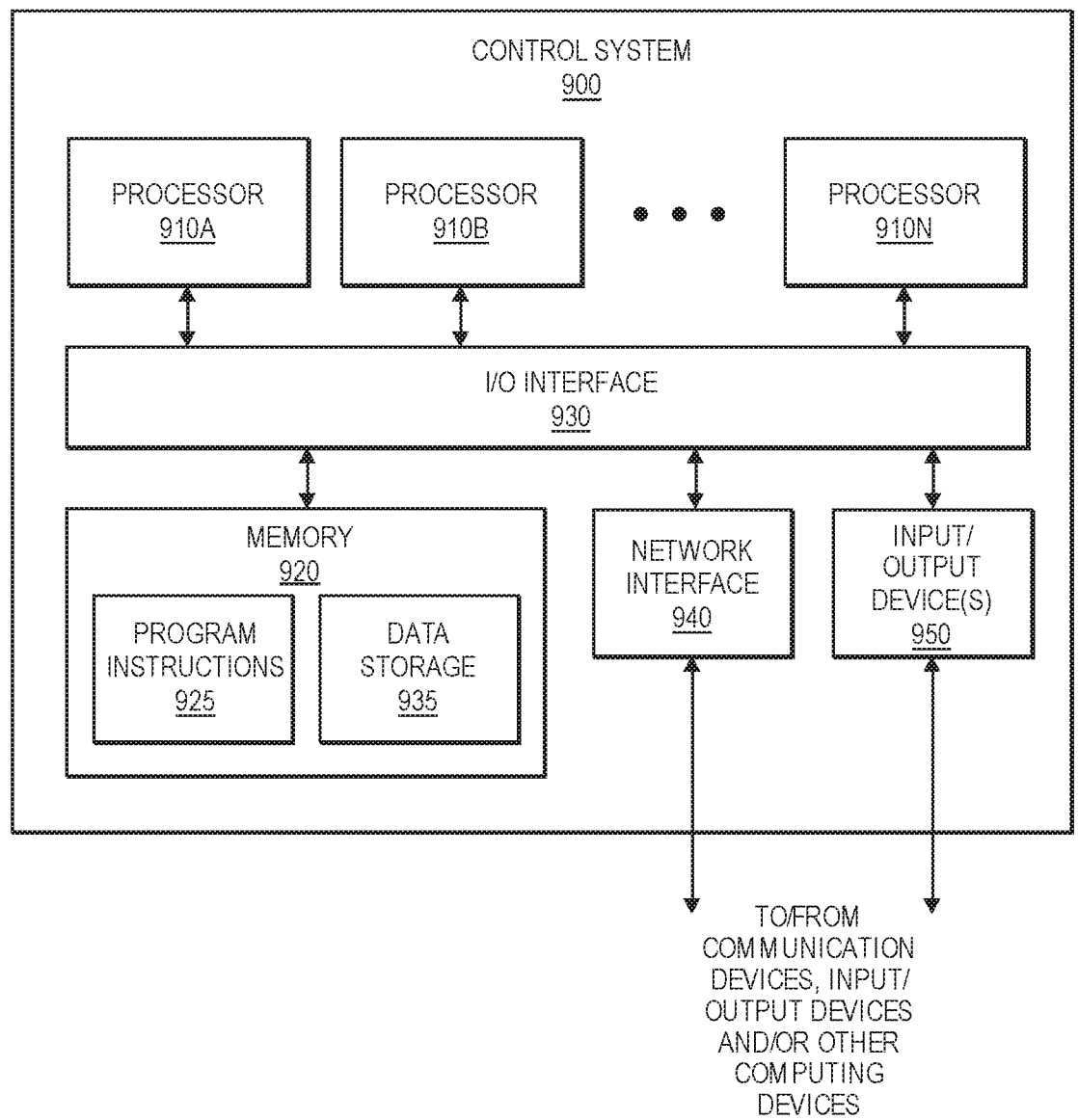
FIG. 9 is a block diagram illustrating an exemplary control system, in accordance with embodiments of the present disclosure.

FIG. 9 is a block diagram illustrating an example control system 900, in accordance with embodiments of the present disclosure. Control system 900 can be an exemplary implementation of control systems 120 and 520 described above in connection with FIGS. 1 and 5, respectively.

Although control systems 120, 520, and 900 have been generally described herein as separate and in communication with the various components of the exemplary systems and methods described herein, in other example embodiments, control systems 120, 520, and 900, or portions thereof may be combined or integrated with one or more other portions, components, or elements of the systems. For example, control systems 120, 520, and 900 may be integrated with one or more of item singulation stations 104, 200, or 504, universal item sorters 106, 300, or 506, container handling systems 508, 600, or 650, or item packing stations 510 or 700. Various other combinations or integrations of at least a portion of the control system with one or more other portions, components, or elements of the systems and methods described herein may also be used to facilitate movement, separation, presentation, identification, picking, induction, sortation, singulation, and/or packing of one or more items.

Various operations of a control system, such as those described herein, may be executed on one or more computer systems, and/or interacting with various other computers, systems, or devices in a material handling facility, according to various implementations. For example, the control system discussed above may function and operate on one or more computer systems. One such control system is illustrated by the block diagram in FIG. 9. In the illustrated implementation, a control system 900 includes one or more processors 910A, 910B through 910N, coupled to a non-transitory computer-readable storage medium 920 via an input/output (I/O) interface 930. The control system 900 further includes a network interface 940 coupled to the I/O interface 930, and one or more input/output devices 950. In some implementations, it is contemplated that a described implementation may be implemented using a single instance of the control system 900 while, in other implementations, multiple such systems or multiple nodes making up the control system 900 may be configured to host different portions or instances of the described implementations. For example, in one implementation, some data sources or services (e.g., related to item movement, separation, presentation, imaging, identification, picking, placing, sorting, singulating, packing, etc.) may be implemented via one or more nodes of the control system 900 that are distinct from those nodes implementing other data sources or services.

In various implementations, the control system 900 may be a uniprocessor system including one processor 910A, or a multiprocessor system including several processors 910A-910N (e.g., two, four, eight, or another suitable number). The processors 910A-910N may be any suitable processor capable of executing instructions. For example, in various implementations, the processors 910A-910N may be general-purpose or embedded processors implementing any of a variety of instruction set architectures (ISAs), such as the x86, PowerPC, SPARC, or MIPS ISAs, or any other suitable ISA. In multiprocessor systems, each of the processors 910A-910N may commonly, but not necessarily, implement the same ISA.

The non-transitory computer-readable storage medium 920 may be configured to store executable instructions and/or data accessible by the one or more processors 910A-910N. In various implementations, the non-transitory computer-readable storage medium 920 may be implemented using any suitable memory technology, such as static random access memory (SRAM), synchronous dynamic RAM (SDRAM), nonvolatile/Flash-type memory, or any other type of memory. In the illustrated implementation, program instructions and data implementing desired functions and/or processes, such as those described above, are shown stored within the non-transitory computer-readable storage medium 920 as program instructions 925 and data storage 935, respectively. In other implementations, program instructions and/or data may be received, sent or stored upon different types of computer-accessible media, such as non-transitory media, or on similar media separate from the non-transitory computer-readable storage medium 920 or the control system 900. Generally speaking, a non-transitory, computer-readable storage medium may include storage media or memory media such as magnetic or optical media, e.g., disk or CD/DVD-ROM, coupled to the control system 900 via the I/O interface 930. Program instructions and data stored via a non-transitory computer-readable medium may be transmitted by transmission media or signals such as electrical, electromagnetic, or digital signals, which may be conveyed via a communication medium such as a network and/or a wireless link, such as may be implemented via the network interface 940.

In one implementation, the I/O interface 930 may be configured to coordinate I/O traffic between the processors 910A-910N, the non-transitory computer-readable storage medium 920, and any peripheral devices, including the network interface 940 or other peripheral interfaces, such as input/output devices 950. In some embodiments, the I/O interface 930 may perform any necessary protocol, timing or other data transformations to convert data signals from one component (e.g., non-transitory computer-readable storage medium 920) into a format suitable for use by another component (e.g., processors 910A-910N). In some embodiments, the I/O interface 930 may include support for devices attached through various types of peripheral buses, such as a variant of the Peripheral Component Interconnect (PCI) bus standard or the Universal Serial Bus (USB) standard, for example. In some implementations, the function of the I/O interface 930 may be split into two or more separate components, such as a north bridge and a south bridge, for example. Also, in some embodiments, some or all of the functionality of the I/O interface 930, such as an interface to the non-transitory computer-readable storage medium 920, may be incorporated directly into the processors 910A-910N.

The network interface 940 may be configured to allow data to be exchanged between the control system 900 and other devices attached to a network, such as other control systems, computer systems, item singulation stations, universal item sorters, item handling station, item packing stations, vision systems, item picking systems, robotic systems, robotic or mobile drive units and systems, other material handling systems or equipment, or between nodes of the control system 900. In various embodiments, the network interface 940 may support communication via wired or wireless general data networks, such as any suitable type of Ethernet network.

Input/output devices 950 may, in some implementations, include one or more displays, projection devices, audio input/output devices, keyboards, keypads, touchpads, scanning devices, imaging devices, sensors, photo eyes, proximity sensors, RFID readers, voice or optical recognition devices, or any other devices suitable for entering or retrieving data by one or more control systems 900. Multiple input/output devices 950 may be present in the control system 900 or may be distributed on various nodes of the control system 900. In some implementations, similar input/output devices may be separate from the control system 900 and may interact with one or more nodes of the control system 970 through a wired or wireless connection, such as over the network interface 940.

As shown in FIG. 9, the memory 920 may include program instructions 925 that may be configured to implement one or more of the described implementations and/or provide data storage 935, which may comprise various tables, data stores and/or other data structures accessible by the program instructions 925. The program instructions 925 may include various executable instructions, programs, or applications to facilitate item movement, separation, presentation, imaging, identification, picking, placing, sorting, singulating, packing, retrieving, or other processes, such as motor controllers, drivers, or applications, sensor controllers, drivers, or applications, sensor data processing applications, imaging data processing applications, robotic apparatus controllers, drivers, or applications, etc. The data storage 935 may include various data stores for maintaining data related to item singulation stations, universal item sorters, item handling stations, item packing stations, motors, sensors, movement speeds, directions, durations, and/or patterns, sensor data, items, pickable surfaces of items, imaging data, robotic arms, end effectors, upstream systems or processes, downstream systems or processes, etc.

Those skilled in the art will appreciate that the control system 900 is merely illustrative and is not intended to limit the scope of implementations. In particular, the control system and devices may include any combination of hardware or software that can perform the indicated functions, including computers, network devices, internet appliances, robotic devices, etc. The control system 900 may also be connected to other devices that are not illustrated, or instead may operate as a stand-alone system. In addition, the functionality provided by the illustrated components may in some implementations be combined in fewer components or distributed in additional components. Similarly, in some implementations, the functionality of some of the illustrated components may not be provided and/or other additional functionality may be available.

Those skilled in the art will appreciate that, in some embodiments, the functionality provided by the methods, systems, and apparatus discussed above may be provided in alternative ways, such as being split among more software modules or routines or consolidated into fewer modules or routines, and/or being split into additional or fewer robotic or automated units. Similarly, in some implementations, illustrated methods and systems may provide more or less functionality than is described, such as when other illustrated methods instead lack or include such functionality respectively, or when the amount of functionality that is provided is altered. In addition, while various operations may be illustrated as being performed in a particular manner (e.g., in serial or in parallel) and/or in a particular order, those skilled in the art will appreciate that, in other implementations, the operations may be performed in other orders and in other manners. The various methods, apparatus, and systems as illustrated in the figures and described herein represent example implementations. The methods and systems may be implemented in software, hardware, or a combination thereof in other implementations. Similarly, the order of any method may be changed and various features may be added, reordered, combined, omitted, modified, etc., in other implementations.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and nodes may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and/or within less than 0.01% of the stated amount.

As used throughout this application, the word "may" is used in a permissive sense (i.e., meaning having the potential to), rather than the mandatory sense (i.e., meaning must). Similarly, the words "include," "including," and "includes" mean including, but not limited to. Additionally, as used herein, the term "coupled" may refer to two or more components connected together, whether that connection is permanent (e.g., welded) or temporary (e.g., bolted), direct or indirect (e.g., through an intermediary), mechanical, chemical, optical, or electrical.

From the foregoing, it will be appreciated that, although specific implementations have been described herein for purposes of illustration, various modifications may be made without deviating from the spirit and scope of the appended claims and the features recited therein. In addition, while certain aspects are presented below in certain claim forms, the inventors contemplate the various aspects in any available claim form. For example, while only some aspects may currently be recited as being embodied in a non-transitory computer-readable storage medium, other aspects may likewise be so embodied. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A method for automated handling of items, comprising:
    receiving a plurality of items by an item singulation system;
    singulating, using the item singulation system and with no manual handling of the plurality of items, the plurality of items to generate a plurality of singulated items, wherein singulating the plurality of items includes:
        separating each of the plurality of items to include a gap between each of the plurality of items; and
        arranging each of the plurality of items in a substantially straight line;
    transferring, without manual handling, the plurality of singulated items from the item singulation system to an item sortation system;
    sorting, using the item sortation system and with no manual handling of the plurality of singulated items, the plurality of singulated items into a plurality of containers;
    determining, using a container handling system, that a first container from the plurality of containers is full;
    retrieving, using a first robotic arm of the container handling system and with no manual handling of the first container, the first container from the item sortation system;
    transferring, using the first robotic arm of the container handling system and with no manual handling of the first container, the first container to an item packing system;
    receiving the first container at the item packing system; and
    packing, using a second robotic arm of the item packing system and with no manual handling of the first container, the first container.

2. The method of claim 1, wherein receiving the plurality of items includes at least one of:
    receiving the plurality of items in a box; or
    receiving the plurality of items in a tote.

3. The method of claim 1, wherein determining that the first container is full is based at least in part on one of a volume of items held in the first container, a weight of items held in the first container, or a quantity of items held in the first container.

4. The method of claim 1, wherein packing the first container includes palletizing the first container.

5. An automated item handling system, comprising:
    an automated item singulation system including a plurality of conveyors and configured to, at least:
        receive a plurality of items; and
        singulate the plurality of items to generate a plurality of singulated items;
    an automated item sortation system arranged adjacent to the automated item singulation system, such that the plurality of singulated items is transferred from the automated item singulation system to the automated item sortation system without any manual handling of the plurality of singulated items, the automated item sortation system being configured to, at least:
        sort the plurality of items into a plurality of containers;
    an automated container handling system including a first robotic arm and configured to, at least:
        detect that a first container of the plurality of containers is full; and
        retrieve the first container from the automated item sortation system;
    an automated item packing system including a second robotic arm and configured to, at least:
        receive the first container; and
        pack the first container for transport;
    a control system in communication with the automated item singulation system and the automated item sortation system, the control system being configured to, at least:
        instruct movement of the plurality of conveyors to singulate the plurality of items;
        instruct sortation of the plurality of singulated items into the plurality of containers;
        instruct a movement of the first robotic arm of the automated container handling system to retrieve the first container from the automated item sortation system and provide the first container to the automated item packing system; and
        instruct a movement of the second robotic arm of the automated item packing system to engage the first container and arrange the first container into a pallet.

6. The automated item handling system of claim 5, wherein at least one of the automated item singulation system, the automated item sortation system, the automated container handling system, or the automated item packing system is modular.

7. The automated item handling system of claim 6, wherein providing the first container to the automated item packing system includes placing the first container on a conveyor in communication with the automated item packing system.

8. The automated item handling system of claim 6, wherein the automated container handling system is further configured to, at least:
provide, subsequent to retrieval of the first container, an empty container to the automated item sortation system.

9. The automated item handling system of claim 5, further comprising an interface between the automated item singulation system and the automated item sortation system, the interface including one conveyor from the plurality of conveyors of the automated item singulation system that is configured to transfer items singulated by the automated item singulation system directly onto a conveyor of the automated item sortation system.

10. The automated item handling system of claim 5, wherein singulation of the plurality of items to generate the plurality of singulated items includes, at least:
separating each of the plurality of items to include a gap between each of the plurality of items; and
arranging each of the plurality of items in a substantially straight line.

11. The automated item handling system of claim 5, wherein the plurality of items are handled without any manual handling.

12. The automated item handling system of claim 5, wherein receipt of the plurality of items includes at least one of receiving the plurality of items in a tote or in a box.

13. The automated item handling system of claim 12, wherein the automated item singulation system is further configured to rotate the tote or the box to empty the plurality of items held in the tote or the box onto one of the plurality of conveyors.

14. A method for automated handling of items, comprising:
receiving a plurality of items by a modular item singulation system, wherein the modular item singulation system includes a plurality of conveyors configured to receive items and singulate the received items;
singulating, using a movement of the plurality of conveyors of the modular item singulation system, the plurality of items to generate a plurality of singulated items;
directly transferring the plurality of singulated items to a modular item sortation system arranged adjacent to the modular item singulation system without any manual handling of the plurality of singulated items;
sorting, using the modular item sortation system, the plurality of singulated items by directing at least one of the plurality of singulated items into a respective one of a plurality of containers;
detecting, using a modular container handling system, that the respective one of the plurality of containers is full;
retrieving, using a first robotic arm of the modular container handling system, the respective one of the plurality of containers from the modular item sortation system and providing the respective one of the plurality of containers to a modular item packing system;
receiving, at the modular item packing system, the respective one of the plurality of containers;
engaging, using a second robotic arm of the modular item packing system, the respective one of the plurality of containers; and
packing, using the second robotic arm of the modular item packing system, the respective one of the plurality of containers onto a pallet.

15. The method of claim 14, wherein sorting the plurality of singulated items is based at least in part on a destination of the plurality of singulated items.

16. The method of claim 14, wherein the method is automated and includes no manual handling of the plurality of items.

17. The method of claim 14, wherein directly transferring the plurality of singulated items to the modular item sortation system without any manual handling of the plurality of singulated items includes, at least:
moving a first conveyor of the plurality of conveyors of the modular item singulation system to urge the plurality of singulated items disposed on the first conveyor of the modular item singulation system to a second conveyor of the modular item sortation system.

* * * * *